United States Patent [19]
Schmitt et al.

[11] Patent Number: 6,040,981
[45] Date of Patent: Mar. 21, 2000

[54] METHOD AND APPARATUS FOR A POWER SUPPLY CAM WITH INTEGRATED COOLING FAN

[75] Inventors: Ty Schmitt, Round Rock; Vibora Sim, Pflugerville, both of Tex.

[73] Assignee: Dell USA, L.P., Round Rock, Tex.

[21] Appl. No.: 09/237,635

[22] Filed: Jan. 26, 1999

[51] Int. Cl.⁷ ...................................................... H05K 7/20
[52] U.S. Cl. ........................ 361/695; 361/687; 361/727; 361/685; 369/75.1; 312/221
[58] Field of Search ..................................... 361/683, 695, 361/725, 730, 732, 728, 684, 685–692, 727; 369/75.1, 75.2, 292; 360/86, 97.01, 98, 99, 137; 312/332.1, 221, 220, 219, 111; 439/157, 59, 928.1

[56] References Cited

U.S. PATENT DOCUMENTS

| | | |
|---|---|---|
| 5,010,426 | 4/1991 | Krenz ..................................... 360/97.01 |
| 5,077,722 | 12/1991 | Geist et al. .............................. 369/75.1 |
| 5,463,742 | 10/1995 | Kobayashi . |
| 5,523,917 | 6/1996 | Searby . |
| 5,576,931 | 11/1996 | Crane, Jr. et al. . |
| 5,586,003 | 12/1996 | Schmitt et al. . |
| 5,612,854 | 3/1997 | Wiscombe et al. . |
| 5,668,696 | 9/1997 | Schmitt . |
| 5,694,290 | 12/1997 | Chang et al. ........................... 361/685 |
| 5,694,292 | 12/1997 | Paulsel et al. . |
| 5,701,231 | 12/1997 | Do et al. . |
| 5,745,041 | 4/1998 | Moss . |
| 5,777,848 | 7/1998 | McAnally et al. . |
| 5,788,566 | 8/1998 | McAnally et al. . |
| 5,790,372 | 8/1998 | Dewey et al. . |
| 5,808,867 | 9/1998 | Schmitt et al. ......................... 361/695 |

*Primary Examiner*—Leo P. Picard
*Assistant Examiner*—Michael Datskovsky
*Attorney, Agent, or Firm*—Haynes and Boone, L.L.P.

[57] ABSTRACT

Method and apparatus for mounting a fan to a power supply in a computer are described. A camming handle pivotally connected to the power supply retains the fan and also provides an electrical connection between the fan and power supply. The fan is removably supported proximate to the power supply by the camming handle. Cooling requirements of the power supply dictate the type of fan selected for supporting within the camming handle. The camming handle pivots between open and closed positions with respect to the power supply. When the camming handle is in the closed position, the fan is disposed proximate, but external, to the power supply. A latch is provided for restraining the camming handle from pivotal movement when the camming handle is in the closed position. The camming handle includes two open slots which engage a ledge of the PC chassis. When manual force is applied to open or close the camming handle, leverage from the open slots simultaneously translates the power supply in the same direction as the applied force, thus engaging or disengaging, respectively, the power supply to or from the chassis.

19 Claims, 3 Drawing Sheets

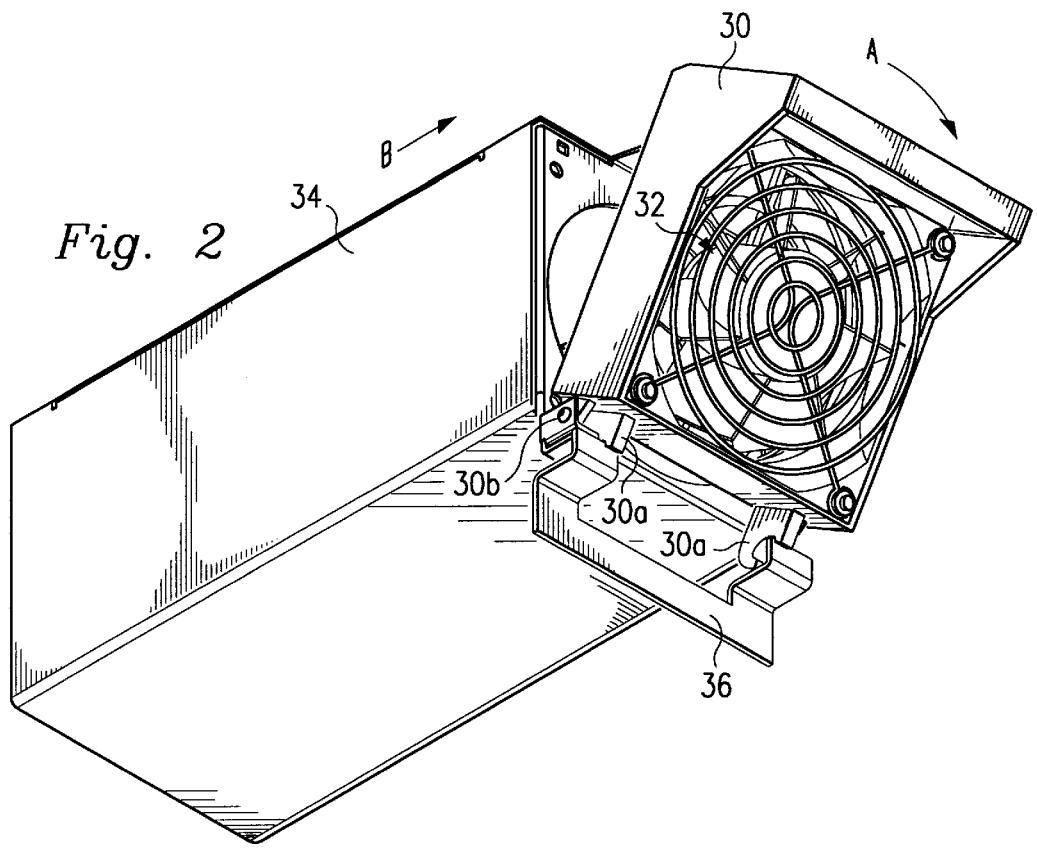
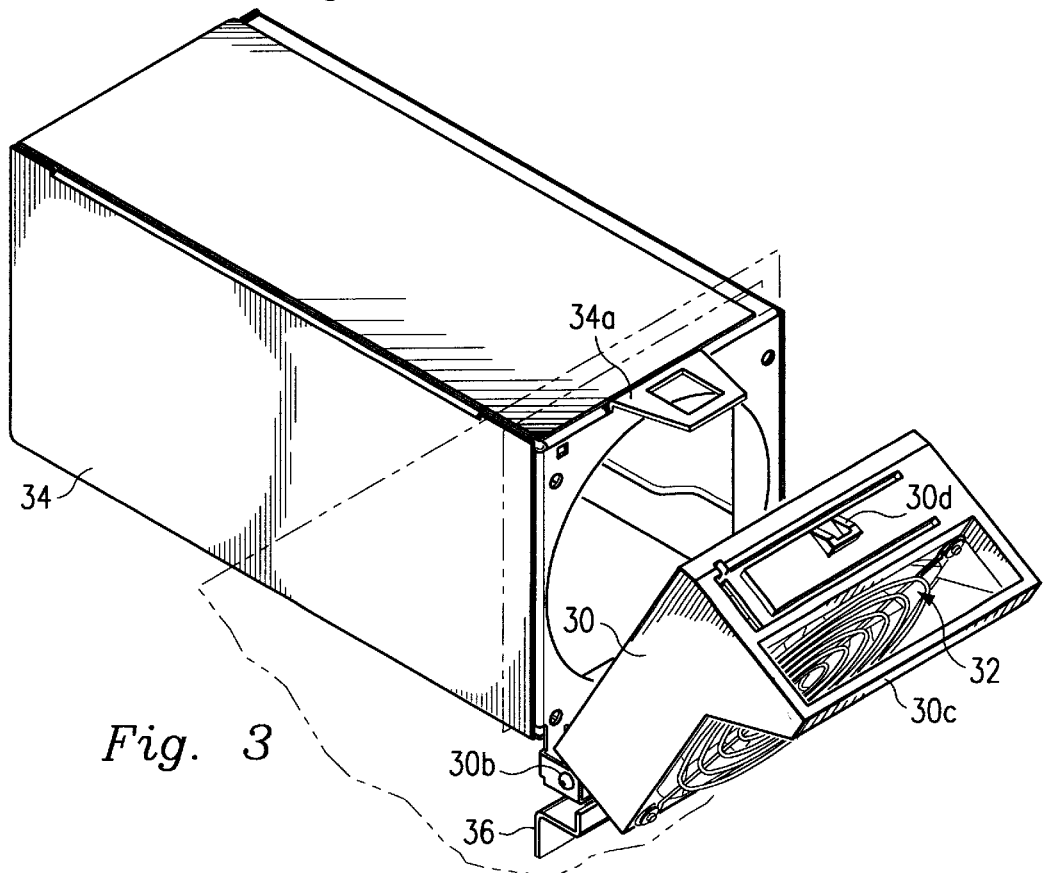

METHOD AND APPARATUS FOR A POWER SUPPLY CAM WITH INTEGRATED COOLING FAN

BACKGROUND

This disclosure relates generally to personal computers ("PCs"), and more particularly to a PC power supply with an integrated cooling fan, and a method for camming said power supply.

Smaller PC designs require more efficient use of space within the chassis. Many PCs include a power supply for converting alternating current to direct current, which operates the PC's components. Several types of PCs, such as servers, need a very compact hot plug power supply.

The power supply requires a fan to cool the power supply by a method well known. Most fans are mounted internally, within the casing of the power supply. Such a design wastes interior space equivalent to the thickness of the fan. Also, internally mounting the fan within the power supply needlessly complicates replacing the fan. This is especially true since the fan is the most likely component within the PC to fail.

Therefore, what is needed is an improved method and apparatus for providing a power supply of a PC with a fan in a manner that renders the fan accessible for service, while optimizing the use of the space available within the PC chassis.

SUMMARY

Accordingly, one embodiment relates to a method and apparatus for mounting a fan to a power supply in a PC. A camming handle pivotally connected to the power supply retains the fan and provides an electrical connection between the fan and power supply. The fan is removably supported proximate to the power supply by the camming handle. Cooling requirements of the power supply dictate the type of fan selected for supporting within the camming handle.

The camming handle pivots between opened and closed positions with respect to the power supply. When the camming handle is in the closed position, the fan is disposed proximate, but external, to the power supply. A latch is provided for restraining the camming handle from pivotal movement when the camming handle is in the closed position. The camming handle includes two open slots which engage a ledge of the PC chassis. When manual force is applied to open or close the camming handle, leverage from the open slots simultaneously translates the power supply in the same direction as the applied force, thus engaging or disengaging, respectively, the power supply to or from the chassis.

A principal advantage of the embodiment described herein is that the fan used to cool the power supply is more easily accessible. Another advantage of the embodiment described herein is that fans of a predetermined diameter, but differing thicknesses, can be retained within the camming handle to modify airflow. Yet another advantage of the embodiment described herein is that it facilitates mechanical and electrical connection between the power supply and the PC.

BRIEF DESCRIPTION OF THE DRAWINGS

FIG. 2 is a bottom perspective view of a power supply according to one embodiment.

FIG. 3 is a top perspective view of the power supply of FIG. 2.

DESCRIPTION OF A PREFERRED EMBODIMENT

Figure 1:
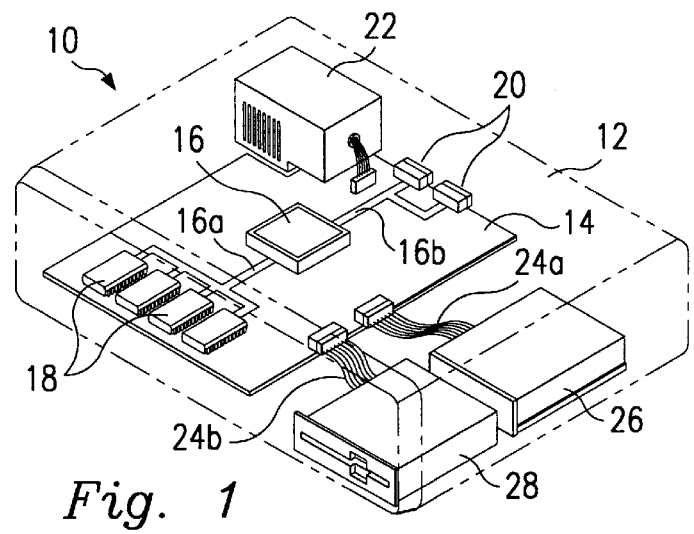
FIG. 1 is a schematic of the interior of a PC chassis.

FIG. 1 depicts a PC, designated generally by a reference numeral 10, which may be, for example, a server PC, a portable PC, or a tower PC. The PC 10 includes a chassis 12 in which a motherboard 14 is mounted. A processor 16, a plurality of memory devices or modules 18, and one or more input/output (I/O) devices, represented in FIG. 1 by two I/O devices 20, are mounted on the motherboard 14. Two buses 16a and 16b are also provided on the motherboard 14 and connect the processor 16 to the memory modules 18 and to the input/output devices 20, respectively. A power supply 22 is connected to the motherboard 14, and a pair of cable assemblies 24a and 24b connect the motherboard to a hard disk drive unit 26 and a floppy disk drive unit 28, respectively. It is understood that other components, electrical traces, electrical circuits and related devices (not shown) are provided in the chassis 12. Since these are all conventional, they will not be described in any further detail.

FIG. 2 is a bottom perspective view of the power supply 34 according to one embodiment. The power supply itself is conventional and will not be described except as pertains to the present embodiment. As shown in FIG. 2, the power supply 34 includes a camming handle 30 for retaining a power supply fan 32 proximate to the power supply and for providing an electrical connection (not shown) between the fan and power supply. The fan is interchangeable, as will be described.

The camming handle 30 has two open slots 30a and is mounted to the power supply 34 via a pivot 30b by any known method. The camming handle is made of plastic or some other moldable material. Open slots 30a of the camming handle engage a ledge 36 of the PC chassis 12 (FIG. 1). The ledge is made of any strong material, such as metal.

In operation, manual force is applied to the camming handle 30 in a direction indicated by an arrow designated by a reference numeral A. As a result, leverage developed from the open slots 30a of the camming handle moves the camming handle in the direction A. The pivot 30b attaches the power supply to the camming handle above the open slots, and therefore movement of the camming handle translates the power supply 34 in the same direction as the applied force, as indicated by an arrow designated by a reference numeral B.

Translating the power supply outward disconnects the power supply connectors (not shown) from connectors of the computer (not shown). Further, the leverage provided by the camming handle lessens the applied force required for connection or disconnection of the power supply. Also, the camming handle, by virtue of its two open slots, guides the power supply in a straight path for proper connection with the computer. For purposes of illustration, the camming handle 30 of the power supply 34 is shown in an open position.

FIG. 3 is a top perspective view of the power supply 34 of FIG. 2. As best shown in FIG. 3, the camming handle 30 further includes a handle 30c for grasping to apply force. A protuberance or boss 30d is provided on the handle. The boss 30d engages a latch 34a when the power supply is in a closed position to restrain the camming handle 30 from pivotal motion. The latch is made of a flexible material for reasons to be described.

Figure 4:
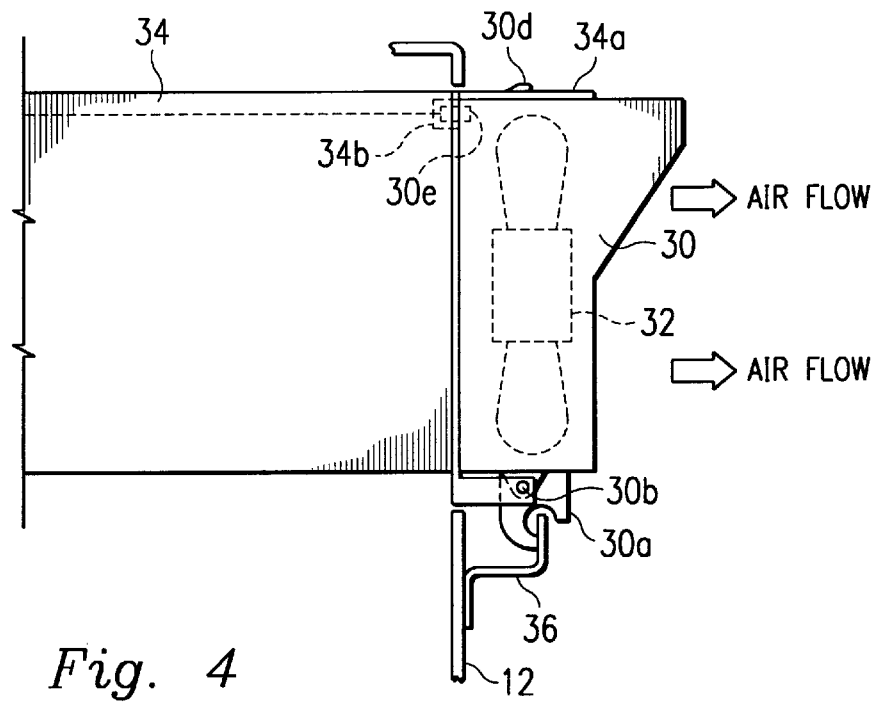
FIG. 4 is a cutaway view of the power supply.

FIG. 4 is a cutaway view of the power supply 34 showing the camming handle 30 thereof in a closed position. As previously described, the camming handle 30 fixedly retains the fan 32 of the power supply, and also provides an electrical connection for the fan 32 via the camming handle's male connector 30e and a female connector 34b of the power supply 34.

The pivot 30b mounts the camming handle 30 to the power supply 34 in a pivotable relationship. The pivot translates the force applied to the camming handle to the power supply. As shown in FIG. 4, when the camming handle 30 is in a closed position, the power supply 34 is engaged in the chassis 12. The boss 30d engages the latch 34a, thus retaining the camming handle in a closed position.

Figure 5:
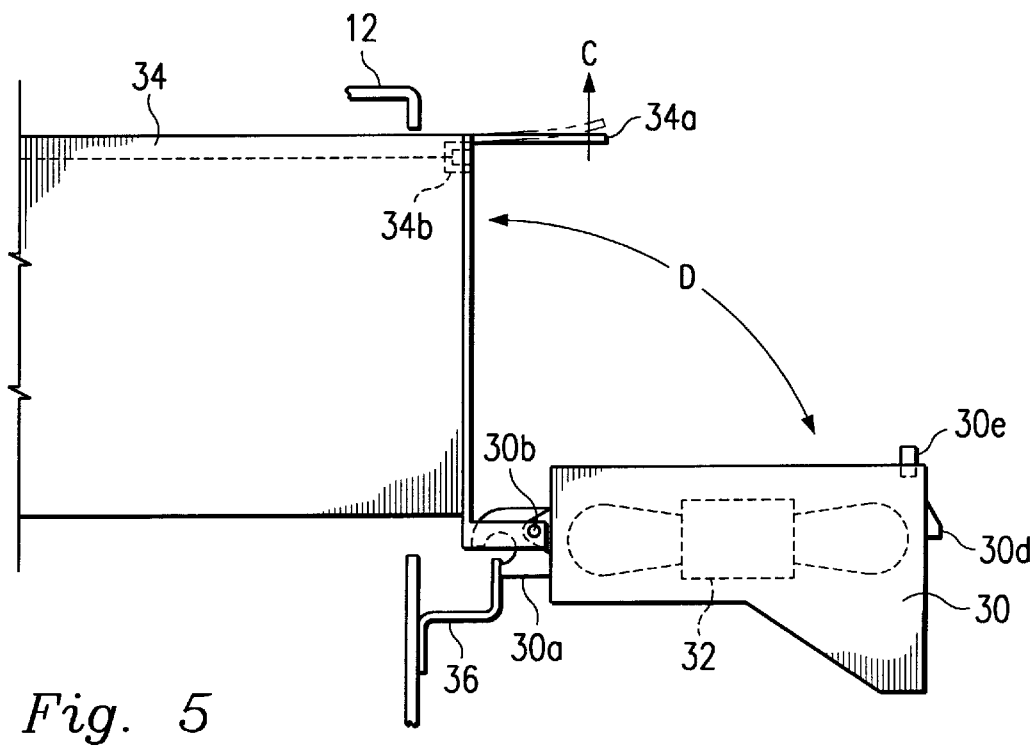
FIG. 5 is a cutaway view of the power supply.

FIG. 5 is a cutaway view of the power supply 34 showing the camming handle 30 thereof in an open position. Application of force to the latch 34a in a direction indicated by an arrow designated by a reference numeral C flexes the latch upward, thereby releasing the boss 30d from the latch 34a. When the boss is disengaged from the latch, the camming handle 30 is free to pivot about pivot 30b.

When manual force is applied to the camming handle 30 in a direction indicated by an arrow designated by a reference numeral D, the camming handle open slots 30a engage the ledge 36 of the chassis 12, translating the power supply 34 in the same direction as the applied force, as shown in FIG. 5, outward from the chassis 12. Pulling the camming handle to an open position, as shown in FIG. 5, also disconnects the male connector 30e of the fan 32 from the female connector 34b of the power supply 34, thus interrupting the flow of electricity to the fan 32. In another embodiment (not shown), the standard power supply has an AC receptacle in the external face of the power supply under the handle. The AC cord must be disconnected before applying force to the handle because of structural interference, which serves as a safety feature.

Figure 6:
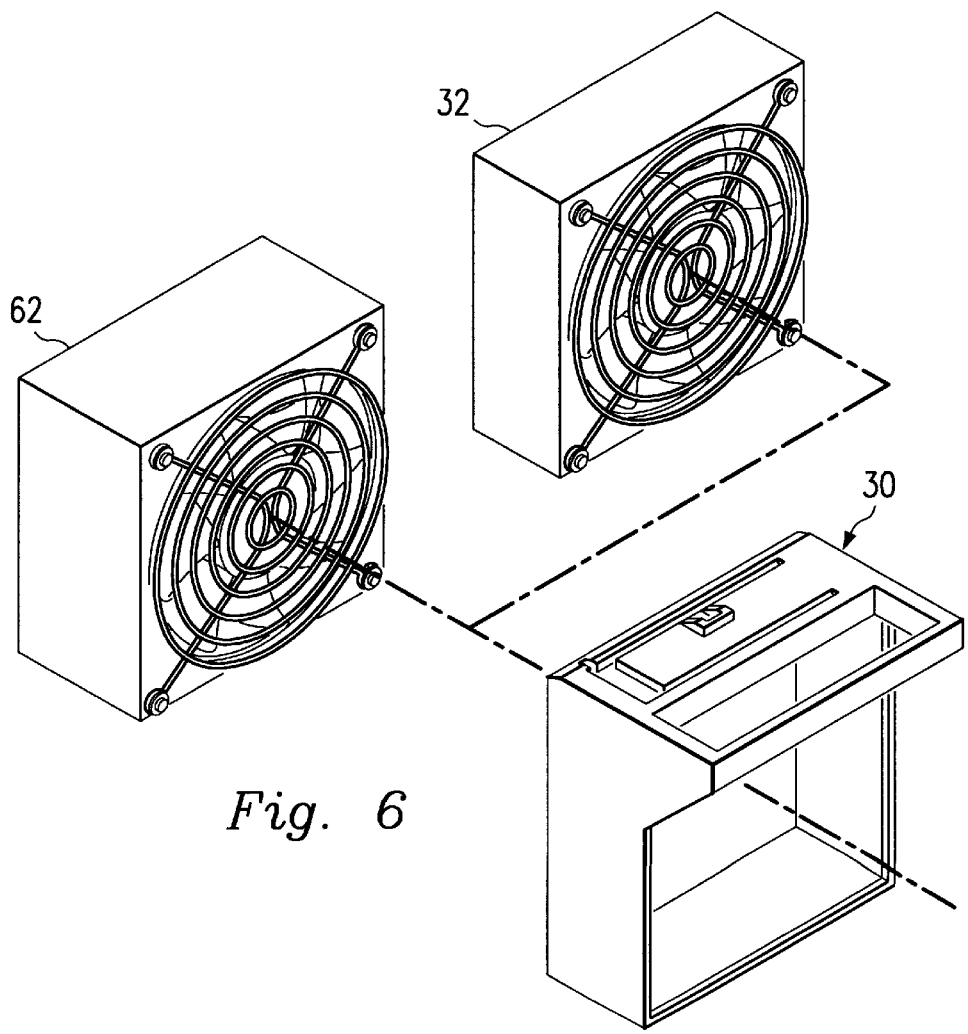
FIG. 6 is a top perspective view of the camming handle and interchangeable fans of FIG. 2.

FIG. 6 is a perspective view of the camming handle 30, showing that the power supply fans 32 and 62 are interchangeable. The camming handle can accept fans of a predetermined diameter, but varying thicknesses. As illustrated, fan 62 has the same height and width as fan 32, but is much thicker. Fan choice is based on the requirements of the power supply for giving optimal cooling. The fans are affixed to the camming handle by plastic rivets (not shown) or the like.

As can be seen, the principal advantages of these embodiments are facilitating connection of the power supply, making the power supply fan more accessible, and accommodating differing thicknesses of fans, thus making the power supply more adaptable.

This disclosure shows and describes illustrative embodiments, however, the disclosure contemplates a wide range of modifications, changes and substitutions. Such variations may employ only some features of the embodiments without departing from the scope of the underlying embodiment. Accordingly, any appropriate construction of the appended claims will reflect the broad scope of the underlying embodiment.

What is claimed is:

1. A computer system comprising:
    a chassis,
    a power supply for mounting in the chassis,
    a fan for cooling the power supply, and
    a camming handle for supporting the fan, wherein the camming handle is connected to the power supply and is moveable between an open and a closed position, the camming handle including a portion for engaging the chassis, wherein movement of the camming handle to the closed position causes the power supply to be translated to an engaged position relative to the chassis and causes the fan to be aligned into a cooling position relative to the power supply.

2. The computer system of claim 1 wherein the engagement portion of the camming handle comprises at least one open slot.

3. The computer system of claim 1 wherein the fan is aligned into a cooling position external to the power supply when the camming handle is in the closed position.

4. The computer system of claim 1 further comprising an electrical connector associated with the fan and a complementary electrical connector associated with the power supply, wherein when the camming handle is in the closed position, the electrical connectors align with one another and connect to power the fan.

5. The computer system of claim 1 wherein the camming handle includes a boss and the power supply includes a latching member such that when the boss is retained within the latching member, the camming handle is restrained from pivotal movement.

6. The computer system of claim 1 wherein the fan is removably supported by the camming handle.

7. The computer system of claim 1 wherein the cooling requirements of the power supply dictate the fan type selected for supporting within the camming handle.

8. A power supply mounted in a chassis comprising:
    a fan for cooling the power supply, and
    a camming handle for supporting the fan, wherein the camming handle is connected to the power supply and is moveable between an open and a closed position, the canning handle including a portion for engaging the chassis, wherein movement of the camming handle to the closed position causes the power supply to be translated to an engaged position relative to the chassis and causes the fan to be aligned into a cooling position relative to the power supply.

9. The power supply of claim 8 wherein the fan is external to the power supply when the camming handle is in the closed position, and wherein the fan is removably supported by the camming handle.

10. The power supply of claim 8 further comprising:
    an electrical connector associated with the fan and a complementary electrical connector associated with the power supply, wherein when the camming handle is in the closed position, the electrical connectors are engaged, powering the fan, and
    a boss and a latching member associated with the power supply and camming handle such that when the boss is retained within the latching member, the camming handle is restrained from pivotal movement.

11. A computer comprising:
    a chassis;
    a power supply for slidably mounting in the chassis;
    a fan for cooling the power supply;
    means for supporting the fan relative to the power supply, wherein the supporting means is a camming handle connected to the power supply and moveable between an open and a closed position, such that movement of the camming handle to the closed position aligns the fan in a cooling position relative to the power supply; and
    means for translating the power supply between an engaged position and unengaged position relative to the chassis.

12. The computer of claim 11 wherein the translating means is also the camming handle, the camming handle including a portion for engaging the chassis, wherein movement of the camming handle to the closed position causes the power supply to be translated to an engaged position relative to the chassis.

13. The computer of claim 11 further comprising a boss and latching member associated with the camming handle and the power supply for restraining the camming handle from pivotal movement when the boss is retained by the latching member.

14. A method for mounting a fan externally to a power supply, the method comprising:

providing a camming handle on the power supply, the camming handle being pivotal with respect to the power supply between open and closed positions, supporting a fan within the camming handle, and providing the fan and the power supply with complementary electrical connectors such that when the camming handle is in the closed position, the complementary electrical connectors are engaged for powering the fan.

15. The method of claim 14 further comprising:

providing a portion of the camming handle for engaging a computer chassis such that during movement to the closed position, the power supply is translated to an engaged position relative to the chassis and the fan is aligned into a cooling position relative to the power supply, whereupon the fan is removably supported by the camming handle and wherein the cooling requirements of the power supply dictate the type of fan selected for supporting within the camming handle.

16. The method of claim 14 further comprising providing a means for restraining the camming handle from pivotal movement when the camming handle is in the closed position relative to the power supply.

17. A computer comprising:

a chassis;

a power supply slidably mounted in the chassis;

a fan for cooling the power supply; and a camming handle connected to the fan and pivotable between an open and a closed position.

18. The computer of claim 17 wherein movement of the camming handle to the closed position aligns the fan in a cooling position relative to the power supply.

19. The computer of claim 17 wherein movement of the camming handle to the closed position translates the power supply between an engaged position and unengaged position relative to the chassis.

* * * * *